Sept. 9, 1969  R. C. RUDDUCK ET AL  3,466,653

METALLIC-POST REFLECTING WALLS

Filed April 26, 1968  4 Sheets-Sheet 1

INVENTOR.
ROGER C. RUDDUCK
JOHNSON J. H. WANG

BY *Anthony D. Cennamo*

ATTORNEY

Sept. 9, 1969  R. C. RUDDUCK ET AL  3,466,653
METALLIC-POST REFLECTING WALLS
Filed April 26, 1968  4 Sheets-Sheet 4

INVENTOR.
ROGER C. RUDDUCK
JOHNSON J. H. WANG
BY
ATTORNEY

United States Patent Office 3,466,653
Patented Sept. 9, 1969

3,466,653
METALLIC-POST REFLECTING WALLS
Roger C. Rudduck and Johnson J. H. Wang, Columbus, Ohio, assignors to The Ohio State University Foundation, Columbus, Ohio
Filed Apr. 26, 1968, Ser. No. 724,404
Int. Cl. H01q 7/36
U.S. Cl. 343—18     7 Claims

ABSTRACT OF THE DISCLOSURE

The invention is for metallic-post reflecting walls utilizing uniaxial anisotropic properties to obtain reflectivity of same-sense circularly polarized electromagnetic energy.

BACKGROUND

In an aircraft landing radar system employing a passive echo-enhancement technique, a corner reflector is mounted in the aircraft to increase the radar cross section for the tracking signal. Transmitting and receiving antennas designed for the same-sense circular polarization are used to provide large reduction in rain clutter. Rain clutter is, to a high degree, polarized in the opposite sense of rotation to that transmitted and will be rejected by use of same-sense circular polarization. A properly designed corner reflector, mounted in the aircraft with its electrical axis aligned toward the radar, provides a large and stable echo signal many times larger than the skin return from the aircraft. Proper design of a trihedral corner reflector implies that the reflector has been modified so as to return a large echo signal with the same sense of circular polarization as the illuminating wave. This has been achieved by use of reactive walls formed by multilayer dielectric coatings on one of the three faces of the corner reflector. These designs consist of thin layers with thicknesses on the order of $0.10\lambda$, therefore fabrication tolerances are severe for $K_a$ band. In addition to fabrication tolerances, the performance of multilayer dielectric walls is greatly affected by very thin layers of rain water on the wall. The dielectric multilayer reactive walls rely on high values of stored energies in their thin layers to produce same-sense circular polarization reflection. Thus small changes in dimensions or dielectric constants cause large changes in the stored energies or reactive power causing significant changes in same-sense circular polarization reflection. Although the actual thickness of rain which accumulates under flight conditions is unknown, rain is a limitation to the use of dielectric multilayers, and a rain elimination technique such as a radome may be required.

SUMMARY OF THE INVENTION

The invention relates to the reflection of electromagnetic waves. An ordinary metal surface will reflect the two major polarization components out of phase and consequently will reflect circular polarization in the opposite-sense to the incident wave. The metallic-post structures of the invention have been designed to give reflection of the linear polarization components in phase and consequently to reflect same-sense circular polarization. This same-sense circular polarization return is accomplished by use of uniaxial anisotropic reflecting walls. Two means are employed to obtain a uniaxial anisotropic surface. In the first embodiment, parallel metallic posts are uniformly embedded in a dielectric foam layer. This metallic-post layer is mounted above a conducting surface in such a manner that there is an air gap between the two surfaces. The second embodiment is fabricated from a uniform array of parallel metallic posts erected on a conducting surface without use of a dielectric material.

These metallic-post walls operate on the principle that the linear component of the incident wave with polarization perpendicular to the posts tends to be little affected by the post medium, whereas the polarization component parallel to the posts tends to reflect near the top of the post medium. Consequently, post heights exist which would give complete same-sense circular polarization reflection for at least one angle of incidence.

The present invention solves several problems previously existent in the prior art. Fabrication tolerances are not critical and variations in mechanical dimensions, dielectric constant, and bandwidth up to approximately 10 percent will not greatly affect adequate performance. The effect of rain layers on metallic-post walls is insignificant. The deterimental environmental erosion effects of rain, hail, and pebbles is not substantial with metallic-post reflecting walls. The structures of the invention can be designed to achieve any desired polarization properties, including the reflection of the linear components with a 90° phase shift. The latter example could be applied as a linear to circular polarization converter.

OBJECTS

Accordingly, it is a principal object of the invention to provide an improved electromagnetic wave reflecting wall.

Another object of the invention is to provide an electromagnetic wave reflecting wall which returns a large echo signal with the same sense of circular polarization as the incident wave.

Another object of the invention is to provide an electromagnetic wave reflecting wall which does not require critical mechanical dimensions, dielectric constant, or bandwidth tolerances.

Another object of the invention is to provide an electromagnetic wave reflecting wall, the performance of which, is unaffected by the detrimental environmental erosion effects of rain, hail and pebbles.

A further object of the invention is to provide an electromagnetic wave reflecting wall that will achieve any desired polarization properties.

Still a further object of the invention is to provide an electromagnetic wave reflecting wall that can be utilized in a trihedral corner reflector for use on aircraft.

BRIEF DESCRIPTION OF THE DRAWINGS

For a complete understanding of the invention together with other objects and advantages thereof, reference may be made to the accompanying drawings, in which.

DETAILED DESCRIPTION OF THE DRAWINGS

For thin post diameters, a metallic-post structure will not significantly affect the linear component of an incident wave which is polarized perpendicular to the posts. If the posts are closely spaced (several per wavelength) the linearly polarized component of the wave parallel to the posts would be expected to reflect near the top of the post array.

Figure 1:
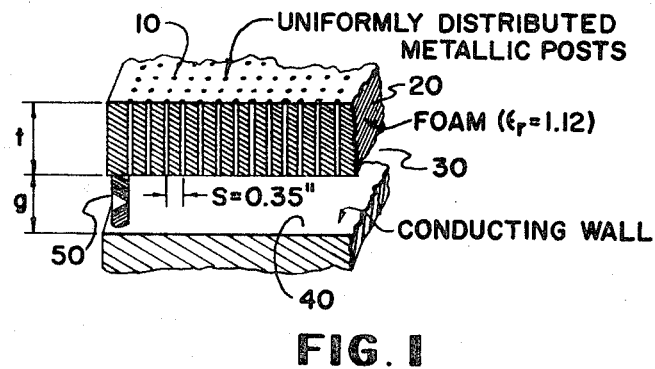
FIGURE 1 is a cross-sectional view of the preferred embodiment of the invention.

The metallic-post reflecting wall illustrated in FIGURE 1 is the preferred embodiment of the invention at 9.5 gHz. The reflecting wall is constructed by embedding metallic posts 10, with a radius of 0.016", uniformly in a dielectric foam layer 20. The dielectric foam layer 20 utilized in the experimental embodiment of the invention consisted of a 10" x 10" 1.12" layer of polystyrene foam with a dielectric constant $\epsilon_r$ of 1.12. The scope of the invention is not to be limited by this choice of dielectric or post dimension. In extreme environmental applications thicker post diameters or the use of a hard dielectric medium in which to embed the posts may be desired. The metallic post layer 20 is mounted as shown in FIGURE 1 so that the air gap 30 between the foam 20 and the conducting surface 40 is adajustable between 0" to 1.00".

This adjustment is accomplished by the use of four supporting screw posts 50 between the four corners of the conducting wall 40 and the dielectric foam layer 20.

Figure 2:
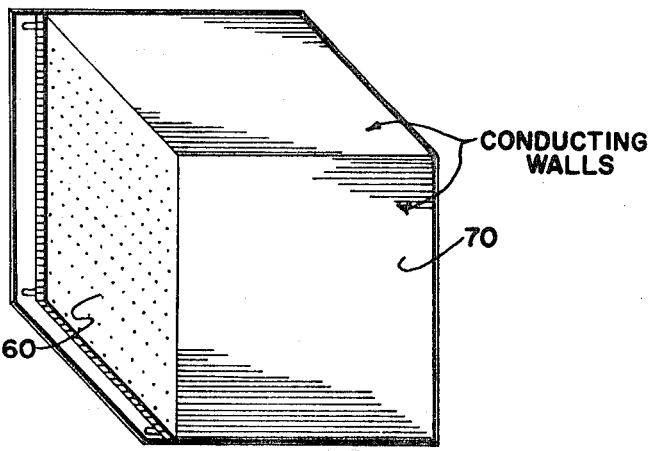
FIGURE 2 is an illustration of the metallic-post reflecting wall of the preferred embodiment of the invention utilized as one surface of a trihedral corner reflector.

FIGURE 2 illustrates the preferred embodiment of the invention 60 utilized as one wall of a trihedral corner reflector 70. In use the spacing of the air gap would be fixed but for experimental purposes the gap was adjustable so that the optimum spacing could be determined.

Figure 3:
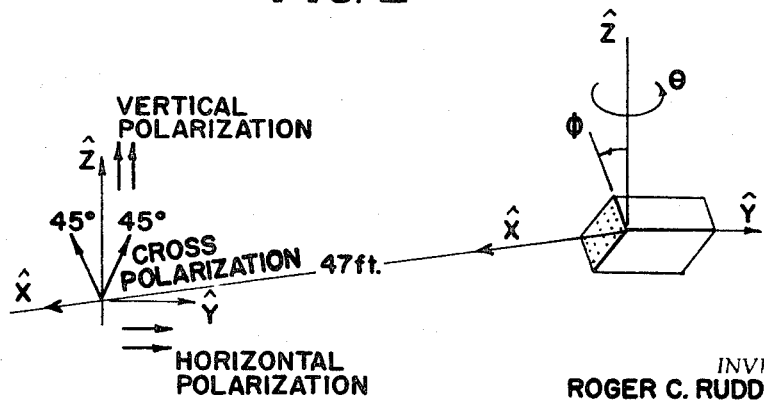
FIGURE 3 is a schematic illustration of the antenna polarizations and reflector orientation used to make experimental measurements of the invention's performance.

The measurement of same-sense circular polarization response was simulated by the technique of cross linear polarizations. In this technique two separate linearly polarized horns are used as transmitting and receiving antennas. The antenna polarizations and reflector orientation are shown schematically in FIGURE 3. The echo-area patterns were taken by rotating the corner reflector about the z axis for a fixed elevation angle. Echo-area patterns were taken for three different antenna polarizations, i.e., horizontal, vertical, and cross polarizations.

Figure 4:
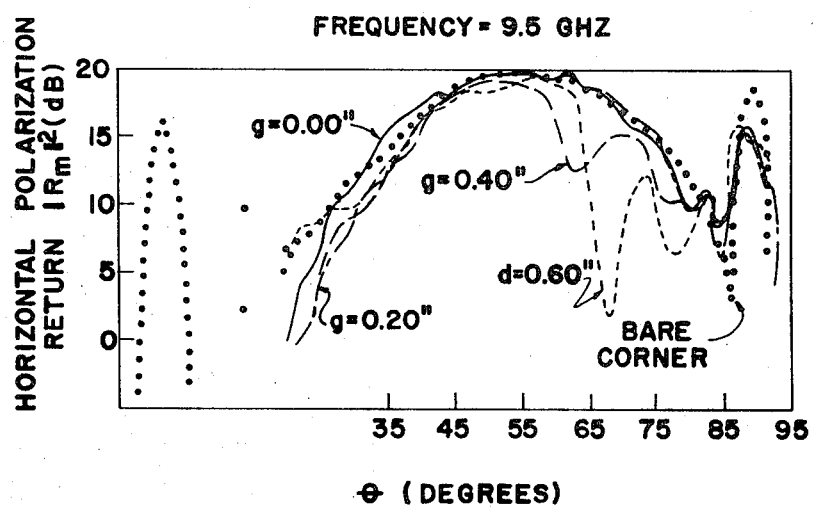
FIGURE 4 is a graphical representation of the measured echo area patterns for horizontal polarization obtained from the reflector embodiment of FIGURE 2.

Measurements taken from the reflector configuration in FIGURE 2 revealed that the vertically polarized patterns (i.e., polarization perpendicular to the posts) were the same as the linearly polarized pattern from the bare corner reflector (without a metallic-post wall). The horizontally polarized patterns, shown in FIGURE 4, also were not significantly affected except for cases in which there was an appreciable air gap between the metallic-post foam layer and the original corner reflector wall. The dips in the horizontally polarized patterns for angles of incidence greater than 60° can be explained by the refraction properties of a high dielectric layer above a low dielectric layer of appreciable thickness compared to that of the corner reflector. On the basis of a conventional ray optics refraction analysis it can be shown that many of the horizontally polarized rays which are incident upon the corner reflector at an angle near grazing to the metallic-post wall will not be refracted back into the return direction. Consequently, good metallic-post designs should avoid appreciable air gaps between the post layer and the basic corner reflector wall.

The tangential component of the dielectric constant $\epsilon_t$ in the metallic-post foam layer is approximately that of the foam, namely 1.12. The normal component of the dielectric constant $\epsilon_n$ is slightly higher than the normal component in the metallic-post structure without foam.

Figure 5:
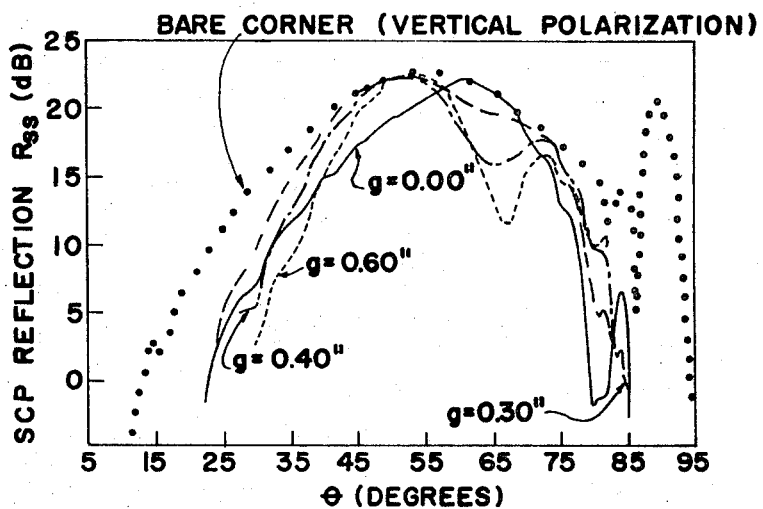
FIGURE 5 is a graphical representation of the measured same-sense circular polarization reflection $R_{ss}$ for various air gaps $g$ between the metallic-post layer and the conducting wall, as a function of the angle of incidence $\theta$ utilizing the reflector embodiment of FIGURE 2.

The experimental reflection patterns for same-sense circular polarization are presented in FIGURE 5, as a function of the angle of incidence. An analysis for the permittivity of metallic-post media is not currently available. Such analysis would permit a more comprehensive treatment of metallic-post structures, and thus would simplify analysis of thick posts.

Figure 6:
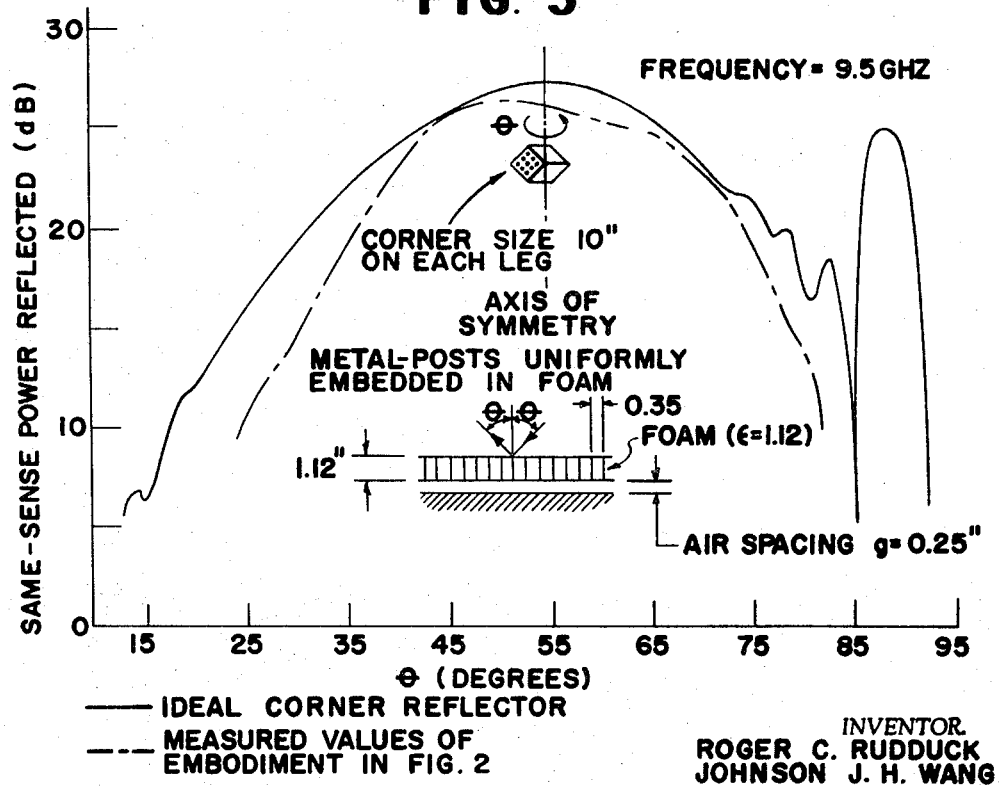
FIGURE 6 is a graphical representation of the measured and calculated same-sense circular polarization reflection $R_{ss}$ for the optimum air gap $g=0.25$ inch, at 9.5 gHz., between the metallic-post layer and the conducting wall, as a function of the angle of incidence $\theta$ utilizing the reflector embodiment of FIGURE 2.

The broadest measured pattern for the same-sense circular polarization corner reflector of FIGURE 2 was obtained with an air gap of 0.25". This pattern which was measured at 9.5 gHz., is shown in FIGURE 6. The mechanical tolerances on post height and air gap spacing are excellent, as seen in FIGURE 5.

Figure 7:
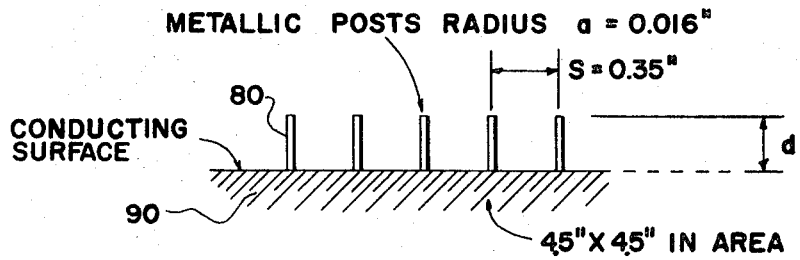
FIGURE 7 is a cross-sectional view of an alternative embodiment of the invention.

An alternative embodiment of the invention is illustrated in FIGURE 7. This metallic-post reflecting wall is fabricated from a uniform array of parallel metallic posts 80 erected on a conducting surface 90. The dimensions shown in FIGURE 7 are for an experimental model designed for X-band testing. The post height $d$ was made adjustable between 0 to 1.11 inch.

The experimental model of FIGURE 7 was tested in a square-face trihedral corner reflector. This model was 4½ inches square and gave useful design information on post heights; however, this four-wavelength square model was too small to give reflectivity patterns indicative of large corner reflector sizes.

Figure 8:
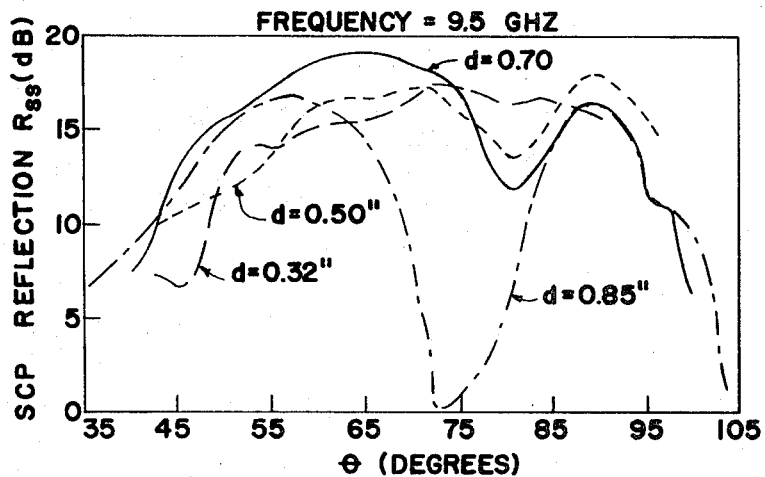
FIGURE 8 is a graphical representation of the measured same-sense circular polarization reflection $R_{ss}$ for various post heights $d$ as a function of the angle of incidence $\theta$ utilizing the reflector embodiment of FIGURE 7.

The vertically polarized patterns (i.e., polarization perpendicular to the posts) were, as in the preferred embodiment, the same as the linearly polarized pattern from the bare corner reflector (without a metallic-post wall). The reflection patterns for same-sense circular polarization are presented in FIGURE 8.

Figure 9:
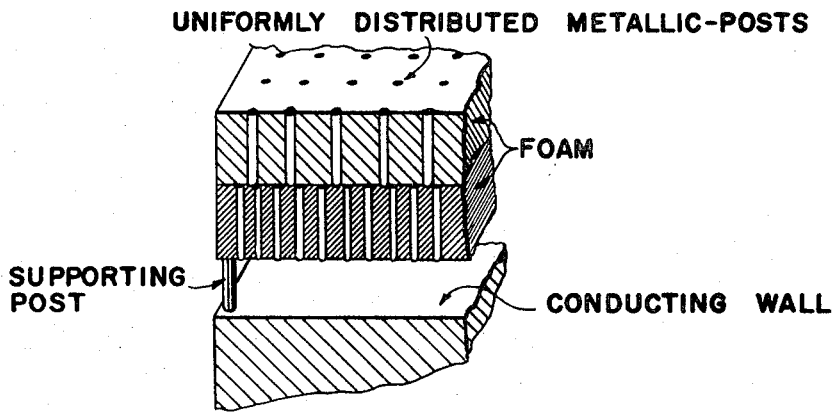
FIGURE 9 is an alternative embodiment of the invention utilizing multiple layers of metallic posts.

Improved performance over a wide range of frequencies can be expected from an alternative embodiment such as the one illustrated in FIGURE 9. Although only two metallic-post layers are shown, a larger number may be utilized. Each layer has the post spacing required for a given range of frequencies and therefore same-sense circular polarization reflectively is increased.

Although certain and specific embodiments have been illustrated, it is to be understood that modifications may be made without departing from the true spirit and scope of the invention.

What is claimed is:

1. A uniaxial anisotropic electromagnetic wave reflecting wall, the improvement comprising a plurality of posts, a layer of dielectric material, and a conducting surface; means for fixedly positioning said layer of dielectric material over said conducting surface to provide an air gap between the adjacent surfaces; means for fixedly positioning said posts within said layer of dielectric material, said posts arranged perpendicular to said conducting surface, and parallel one to the other in a uniform mosaic pattern.

2. A uniaxial anisotropic electromagnetic wave reflecting wall as set forth in claim 1 wherein said plurality of posts are of a metallic material.

3. A uniaxial anisotropic electromagnetic wave reflecting wall as set forth in claim 1 further comprising two or more said layers of dielectric material positioned one over the other, said posts arranged in a uniform pattern within each of said dielectric layers, said uniform pattern of a different spatial relationship in each of said dielectric layers.

4. A uniaxial anisotropic electromagnetic wave reflecting wall, the improvement comprising a plurality of posts of a metallic material, and a conducting surface; means for fixedly positioning said posts perpendicular to said conducting surface, said posts further arranged parallel one to the other in a uniform pattern.

5. A trihedral corner reflector, the improvement comprising a uniaxial anisotropic electromagnetic wave reflecting wall as one wall of said trihedral corner reflector;

said reflecting wall further comprising a plurality of posts, a layer of dielectric material, and a conducting surface; means for fixedly positioning said layer of dielectric material over said conducting surface to provide an air gap between the adjacent surfaces; means for fixedly positioning said posts within said layer of dielectric material, said posts arranged perpendicular to said conducting surface, and parallel one to the other in a uniform mosaic pattern.

6. A trihedral corner reflector, the improvement comprising a uniaxial anisotropic electromagnetic wave reflecting wall as one wall of said trihedral corner reflector; said reflecting wall further comprising a plurality of posts, and a conducting surface; means for fixedly positioning said posts perpendicular to said conducting surface, said posts further arranged parallel one to the other in a uniform pattern.

7. A trihedral corner reflector, the improvement comprising a uniaxial anisotropic electromagnetic wave reflecting wall as one wall of said trihedral corner reflector, said reflecting wall further comprising a plurality of posts, two or more layers of dielectric material, and a conducting surface; means for positioning said two or more layers of dielectric material one over the other to provide intimate contact between the adjacent surfaces; means for positioning said two or more layers of dielectric material over said conducting surface to provide an air gap between the adjacent surfaces of said layers of dielectric and said conducting surface; means for fixedly positioning said posts within each of said dielectric layers, said posts arranged perpendicular to said conducting surface, and parallel one to the other in a uniform mosaic pattern, said uniform pattern of a different spatial relationship in each of said dielectric layers.

References Cited
UNITED STATES PATENTS 2,840,819   6/1958   McClellan.

RODNEY D. BENNETT, Jr., Primary Examiner

B. L. RIBANDO, Assistant Examiner